(12) United States Patent
Fuller

(10) Patent No.: US 11,456,536 B2
(45) Date of Patent: Sep. 27, 2022

(54) RESONANT LOOP OR ANTENNA FOR WIRELESS POWER TRANSFER AND SECURE COMMUNICATION

(71) Applicant: Honeywell International Inc., Morris Plains, NJ (US)

(72) Inventor: Christopher Coy Fuller, Bloomington, MN (US)

(73) Assignee: Honeywell International Inc., Charlotte, NC (US)

(*) Notice: Subject to any disclaimer, the term of this patent is extended or adjusted under 35 U.S.C. 154(b) by 368 days.

(21) Appl. No.: 16/369,403

(22) Filed: Mar. 29, 2019

(65) Prior Publication Data

US 2020/0313297 A1  Oct. 1, 2020

(51) Int. Cl.
*H01Q 9/04* (2006.01)
*H01Q 7/00* (2006.01)
*H02J 50/12* (2016.01)
*H01Q 1/38* (2006.01)
*H04B 5/00* (2006.01)
*H04B 5/02* (2006.01)
*H02J 5/00* (2016.01)

(52) U.S. Cl.
CPC ............ *H01Q 7/00* (2013.01); *H01Q 1/38* (2013.01); *H01Q 9/04* (2013.01); *H02J 5/005* (2013.01); *H02J 50/12* (2016.02); *H04B 5/0031* (2013.01); *H04B 5/0037* (2013.01); *H04B 5/02* (2013.01)

(58) Field of Classification Search
CPC ... H01Q 7/00; H01Q 9/04; H01Q 1/38; H04B 5/02; H04B 5/0031; H04B 5/0037; H04B 5/0081; H02J 5/005; H02J 50/12; H02J 7/025
See application file for complete search history.

(56) References Cited

U.S. PATENT DOCUMENTS 8,324,759 B2  12/2012  Karalis et al.
8,487,478 B2   7/2013  Kirby et al.
(Continued)

OTHER PUBLICATIONS

Rubio et al., "Wireless Energy Transfer Between Anisotropic Metamaterials Shells," 16 pages, accessed Jul. 15, 2019.
(Continued)

*Primary Examiner* — David E Lotter
(74) *Attorney, Agent, or Firm* — Seager, Tufte & Wickhem LLP

(57) ABSTRACT

A resonant antenna for long-range wireless power transfer and communications. The antenna may be powered by a source at a frequency that is resonant for the antenna or harmonic(s) of the resonant frequency. The loop or antenna may be a wire laid out in a physically large network or constitute wiring of a building or other place. The antenna may be placed in a high index material, which results in the antenna to be a physically smaller size for the same electrical size. The antenna may be driven with an electrical power signal. Power may be picked up by another or secondary antenna from the source antenna at the resonant frequency or harmonic(s). Communications may also occur between the antennas. Because of a near-field effect, emanation of electromagnetic fields is primarily limited extensively to just between the antennas. A little stray electromagnetic field exists that others cannot easily intercept.

18 Claims, 12 Drawing Sheets

(56) References Cited

U.S. PATENT DOCUMENTS

| | | |
|---|---|---|
| 8,692,410 B2 | 4/2014 | Schatz et al. |
| 8,766,483 B2 | 7/2014 | Cook et al. |
| 8,968,609 B2 | 3/2015 | Krishna et al. |
| 9,184,632 B2 | 11/2015 | Kirby et al. |
| 9,793,765 B2 | 10/2017 | Cook et al. |
| 2009/0224856 A1 | 9/2009 | Karalis et al. |
| 2010/0034238 A1* | 2/2010 | Bennett ............... H02J 5/005 375/130 |
| 2010/0231053 A1 | 9/2010 | Karalis et al. |
| 2014/0312707 A1 | 10/2014 | Fiorello et al. |
| 2017/0149283 A1* | 5/2017 | Ellwood, Jr. ........ H02J 7/025 |
| 2018/0358841 A1* | 12/2018 | Park ..................... H02J 50/80 |
| 2020/0067350 A1* | 2/2020 | Moffatt ................ H02J 50/20 |

OTHER PUBLICATIONS

"Micro-Energy Harvesting," Analog Devices, 8 pages, accessed Jul. 15, 2019.

* cited by examiner

US 11,456,536 B2

RESONANT LOOP OR ANTENNA FOR WIRELESS POWER TRANSFER AND SECURE COMMUNICATION

BACKGROUND

The present disclosure pertains to wireless transmission techniques.

SUMMARY

The disclosure reveals a resonant loop or antenna for long-range wireless power transfer and secure communications. A source loop or other antenna type which may include a lens may be powered by a source at a frequency that is a resonant for the loop or other antenna type. The antenna may be a wire laid out in a physically large manner or constitute wiring of a building or other situation. The antenna may be placed in a material with a high index which results in the antenna to be a physically smaller size for the same electrical size. The antenna may be driven with an electrical signal. Power may be picked up by another or secondary loop or other antenna type from the source antenna at the resonant frequency or a harmonic. Communications may also occur between the antennas. Because of a near or narrow field effect, emanation of electromagnetic fields is limited to a great degree just between the antennas. There generally is little stray electric field such that others cannot easily intercept emanation for power or communication.

DESCRIPTION

Figure 1:
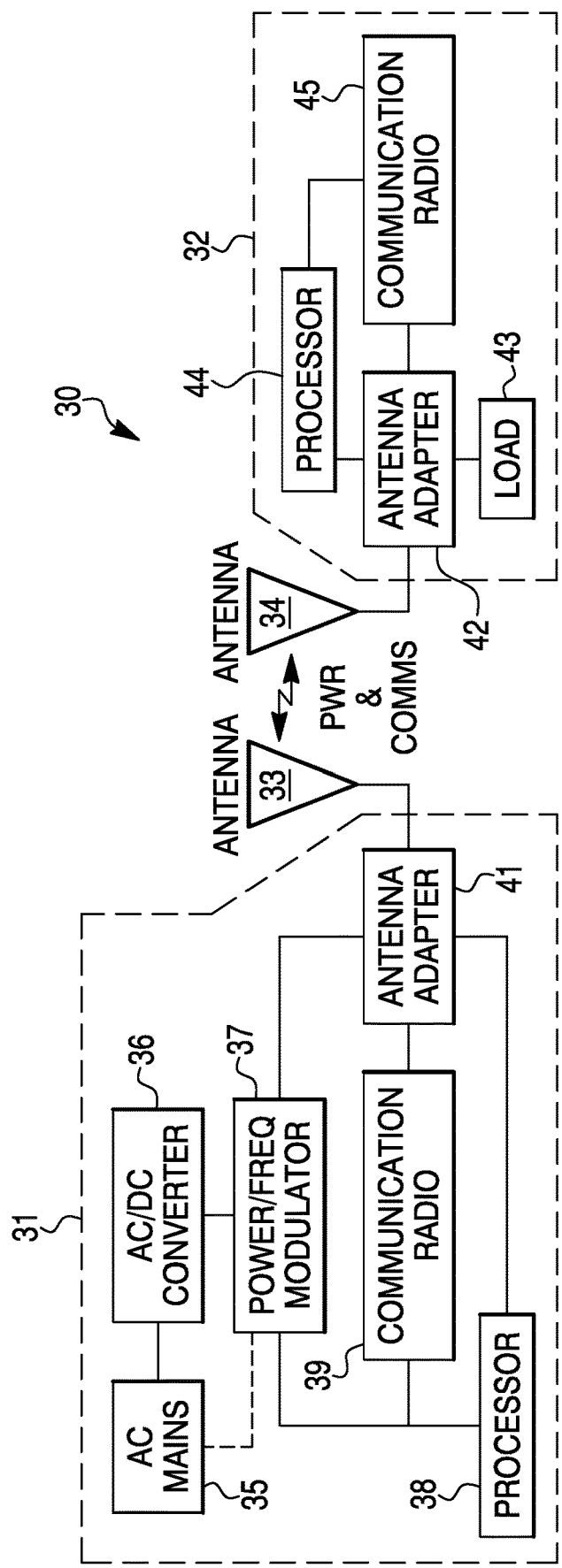
FIG. 1 is a diagram of an illustrative example of a wireless power and communications transfer subsystem.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

The IoT revolution may increase the number of sensors in the world by more than a factor of 100. If all the devices were powered using primary cell batteries, the task of changing batteries could become a serious maintenance problem and environmental issue, especially with wireless devices which need to communicate frequently (e.g., wireless sirens). Many related approaches of providing power wirelessly appear too short in range, too expensive or unsafe.

Further, many related art long-range RF communication approaches may transmit energy using far-field techniques which is very inefficient. An approach to tightly couple a transmission source and receiver efficiently over long distances, without radiating power anywhere except to the receiver, may greatly improve communication security and enable new products which require communications that are not easily intercepted (e.g., military communications, satellite communications, SCADA systems, financial transactions, data from security system cameras inside a home, and so on). Using near-field energy for communications instead of far-field communications may have an added benefit of minimizing the risk of polluting the electromagnetic environment with RF transmissions. The IoT revolution appears to be already running into RF pollution issues at hospitals and other institutions which heavily utilize RF communications. The pollution issue seems to be growing to result in a need for more spectrum and for new standards to move WiFi and other emissions from the 2.4 GHz and 5 GHz bands to other frequencies such as 915 MHz, as the number of devices appears to be growing at an exponentially increasing rate. This situation may pollute every band currently available for such communications, greatly restricting communications between devices.

FIG. 1 is a diagram of an illustrative example of a wireless power and communications transfer subsystem 30, which may incorporate a source 31 and a load or receiver 32. Source 31 may provide power to an antenna 33 which may include parasitic elements for lensing and/or shaping the frequency response. Receiver 32 may take power from antenna 34 which may include parasitic elements for lensing and/or shaping the frequency response. Power may be taken from antenna 33 by antenna 34. Communication signals between antennas 33 and 34 may be in either direction one at a time (half-duplex) or full-duplex for simultaneous bi-directional communication.

Initial power may come from AC mains 35 of, for example, a building or home and go to an AC-DC converter 36. A DC output from converter 36 may go to a power and/or frequency modulator 37. Modulator 37 may receive a signal from AC mains 35 indicating power and/or frequency to aid in power and frequency modulation of the DC signal from converter 36. The AC-DC converter 36 may itself act as a modulator 37, for example, when the converter 36 is implemented as a switching power supply. Even though an output signal may be DC, it still can have a waveform like that of a full or half-wave signal of a simply rectified and unfiltered DC signal. An output from modulator 37 may go to a processor 38, a communication radio 39 and an antenna adapter 41. An output from processor 38 and communication radio 39 may also go to antenna adapter 41. An output from adapter 41 may go to antenna 33. Antennas 33 and 34 may be regarded as loops or other types of antennas including parasitic elements for lensing and/or shaping the frequency response herein.

Power may be detected and taken from antenna 34 which has been launched by antenna 33. Communication signals from antenna 33 may also be detected by antenna 34. Similarly, communication signals may proceed from antenna 34 to be detected by antenna 33 and processed by source 31. Power and communication signals detected by antenna 34 may go to an antenna adapter 42. The power may go from antenna adapter 42 to a load 43. Load 43 may consist of appliances, sensors, and the like that consumes electric power. Power and communication signals may go from antenna adapter 42 to a processor 44 and a communications radio 45. Also, a signal may go from processor 44 to communications radio 45. The communications between communication radios 37 and 45 in a single direction at a time (half-duplex) or in both directions simultaneously (full-duplex).

The present system may have numerous versions. The several versions described herein are illustrative examples. A first version of the present system may have a feature which has an electrically large resonant wireless power loop or antenna embedded in high index material that is a combination of high permittivity (epsilon) material and high permeability (mu) material. By combining a low-cost high permittivity material, such as an X7R ceramic dielectric, which has a permittivity of approximately 3500 with a low-cost ferrite material used in the manufacture of low-cost transformers with a permeability of approximately 3500, a resulting high index substrate may be utilized to reduce the physical size of an embedded resonant loop by a factor up to 3500 compared to the physical size in air, without reducing its electrical size. For an electrically large loop or antenna, the near-field (i.e., range at which efficient power transfer occurs) may extend to about 0.4 times the loop's resonant wavelength. For the example here, the efficient power transfer range of a 300 kHz resonant loop or antenna may be about 400 meters (437 yards) with a size of the loop having to be approximately 3.6 inches (9.0 cm). The cost of the system may be very low as it only needs materials used in low-cost commercial ceramic capacitors, low-cost transformers, copper or other metal wire, and a few low-cost commercial passive components. The receiving loop or other antenna may be much smaller, depending upon the focusing ability of the transmitting loop or other antenna and required system efficiency. The receiving loop or antenna may be made to resonate using inductors and capacitors. Such a device configured with two orthogonal loops or antennas may be smaller than a typical AC mains outlet cover plate.

Another version of the present system may have a feature that has a large wireless power loop or other antenna fitted to the size of a room or attic of a building or possibly embedded in the ground around a building which is operated at resonance via interface electronics to a power grid. For an electrically large loop or antenna, the near-field (i.e., range at which efficient power transfer occurs) may extend to about 0.4 times the wavelength. For an example living room, a single loop or antenna may provide a first resonance at about 8 MHz, which translates to efficient wireless power to approximately a 49 foot (15 meter) range.

Figure 2:
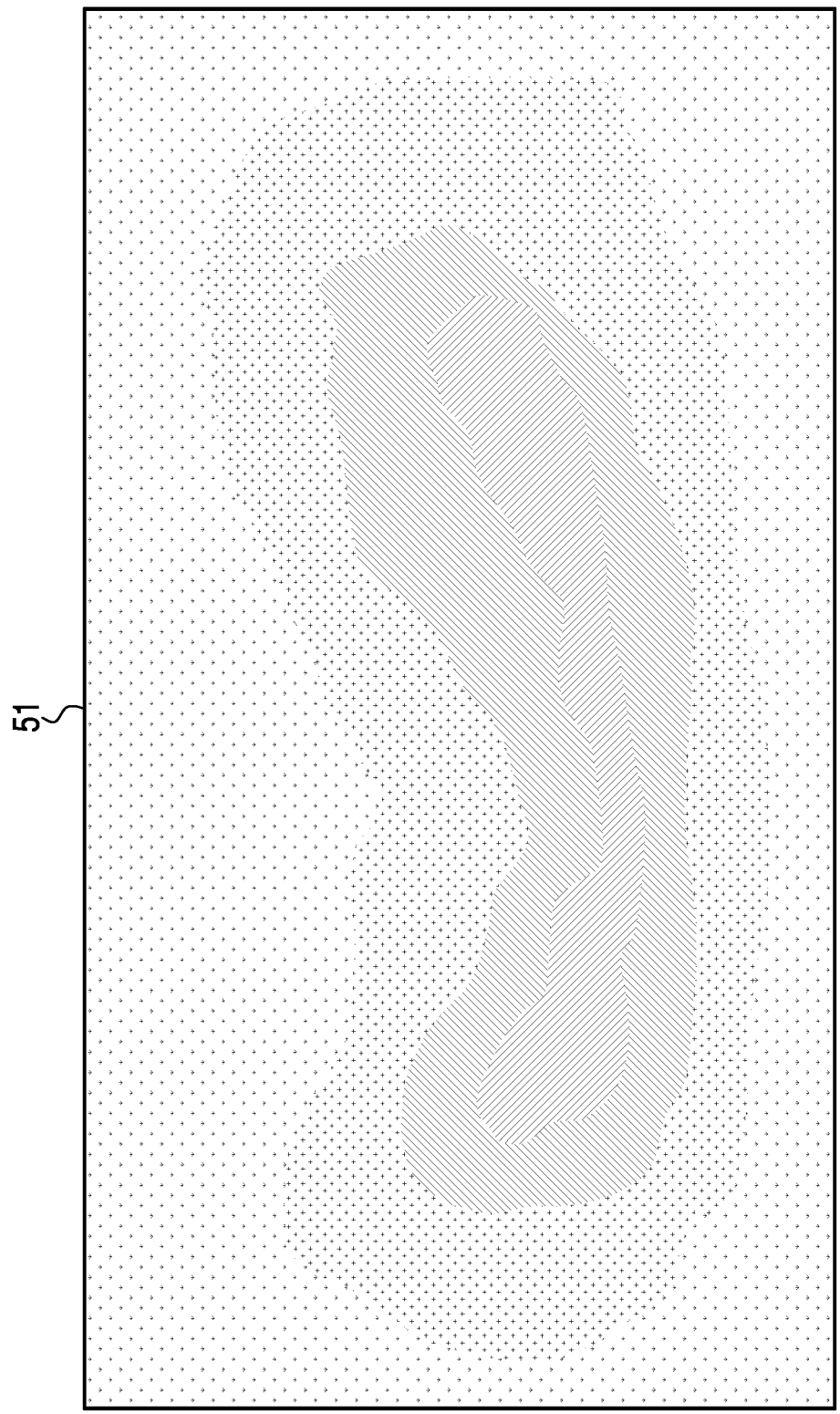
FIG. 2 is a diagram of a graph showing emanated energy in a space at resonance.
Figure 3:
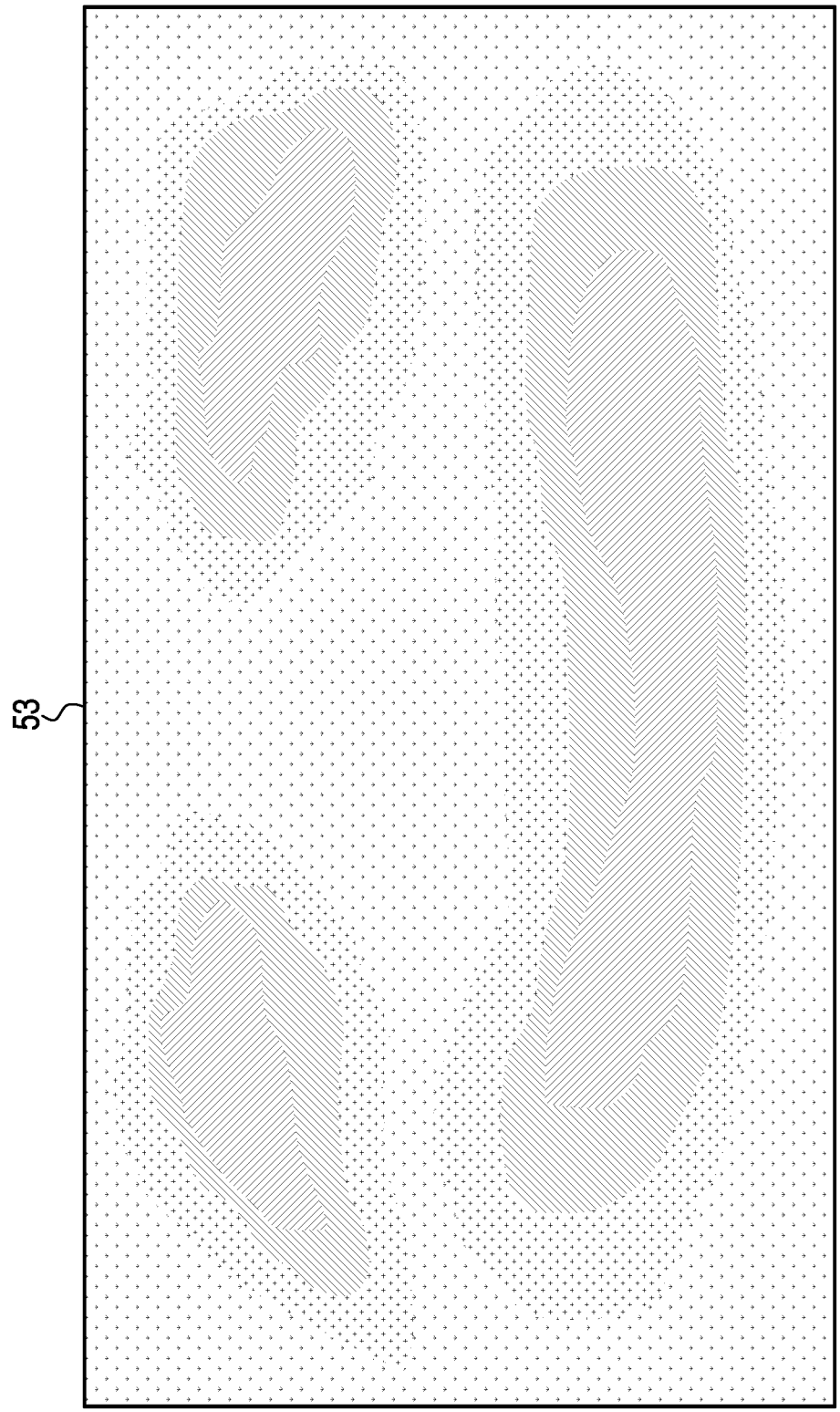
FIG. 3 is a diagram of a graph indicating emanated energy in a space at a third harmonic of resonance.

Higher harmonics may be used to fill in coverage gaps with acceptable power transfer efficiency. FIG. 2 is a diagram of a graph 51 showing a resonant peak at the center of the graph where the darker portion appears in a space, such as a living room. FIG. 3 is a diagram of a graph 53 indicating a third harmonic peak represented with the centers of the three darker portions in the same space as FIG. 2, a hypothetical living room. The shading variation represents various intensities. The variation is not meant to be discrete as it may appear; however, the various patterns are a non-gray scale way of revealing the continuous variation of intensity. Each of the various patterns may represent ranges of intensities of which each two that are adjacent are continual in variation relative to each other.

Communication between the interface or loop or antenna electronics and one or more devices being powered, may be used to dynamically adjust the resonant frequency to maximize delivered power or to switch between resonances and harmonics to ensure that all devices requiring power do receive power. The advantage of such a device is that it may be used to finely control where power and communications are delivered in a passive, efficient and low-cost way and to deny delivering power and communications where not desired. In another embodiment, power and communications may be provided in an efficient way to all devices in a space in a duty-cycled manner by use of resonance and harmonics. Diffraction events may cause energy to be distributed in ways which are not easy to predict, but, in general, one of the resonances or harmonics would most likely provide efficient power and communications over the many frequencies available. A device using such methods for communication and power may be designed to limit the amount of radio energy provided to areas where communication and power are undesired, enabling frequency re-use in the same space, but different directions. In sum, the system may have an electrically large resonant wireless power loop or antenna using simple wiring laid on top of insulation or buried in the yard around a building via a low-cost tuning methods and a variety of power sources, including AC mains. The receiving loop or antenna may be much smaller, but made to resonate using inductors and capacitors similar to those of an invisible dog-fence, but with the purpose of wireless power transfer. Such system may be made at a very low cost.

Another version of the system may have a feature that has a large wireless power "loop" or "antenna" created by the existing network of power wiring in a building which is operated at a resonance via interface electronics to a power source. For an electrically large loop or antenna, the near-field (i.e., range at which efficient power transfer occurs) may extend to about 0.4 times the wavelength. Since building wiring can be much longer than the size of the room, the near-field approach may efficiently couple power at most resonances and harmonics. Communication between the loop or antenna electronics and one or more devices being powered, may be used to dynamically adjust the resonant frequency so as to maximize delivered power or to switch between resonances to ensure that all devices requiring power do receive power. The advantage of such a device may be used to finely control where power and communications are delivered in a passive, efficient and low-cost way and to deny delivering power and communications where not desired. A device using such methods for communication and power may be designed to limit the amount of radio energy provided to areas where communication and power are undesired, enabling frequency re-use in the same space, but different and not necessarily orthogonal directions. In another embodiment, power and communications may be provided in an efficient way to all devices in a space in a duty-cycled manner by use of resonance and harmonics. Diffraction events may cause energy to be distributed in ways which are not easy to predict, but, in general, one of the resonances or harmonics would most likely provide efficient power and communications over the many frequencies available. In sum, the system may have an electrically large resonant wireless power loop or antenna using the existing network of wiring in a building or home via a low-cost tuner and power transformer. The receiving loop or antenna may be much smaller, but made to resonate using inductors and capacitors with the purpose of a wireless power transfer. The system can be made for a very low cost.

The approaches revealed herein have application to wireless power, and have similar techniques that may also be used in a device for communicating data over similar or larger distances, limited by the frequency of operation and the bandwidth of the resonators and RF lenses. Existing encryption techniques used in radio communications may be compatible with the presently described techniques and could be used to further protect sensitive communications.

Dramatically improving communication security in this way may be a new paradigm in the radio communication field which can greatly benefit users of the present system in nearly all product sectors in which radio communications occur in a significant way not seen since the adaption of existing code-division multiple access (CDMA) technology into cell phones, with similar benefits.

The technology described herein may fix the IoT RF pollution crisis as energy and communications is only transferred between the source and destination. The principle of super-position is not necessarily affected by the present approach, so there may be no limit as to the number of devices which can be in simultaneous communication and power delivery in the same space.

A tuning device may be plugged into an outlet in the middle a home and provide efficient wireless power to nearly all devices in a home such as to top off rechargeable batteries, super-capacitors or standard capacitors resulting in lower costs and sizes of battery powered devices while reducing or eliminating the need to replace batteries, thus lowering device maintenance.

In addition to wirelessly powering many types of products in a home, the present system may be used for providing communications with the devices to which power is also being provided, to devices which require communications, and to facilitate communication between devices.

The present system may have a software component. There may be sensors that are hardware devices with some embedded software measuring/detecting and transmitting data (e.g., temperature, pressure, and/or motion). There may be software that runs in a device or unit (e.g., firmware). The system may have an IoT (i.e., Internet of Things) component.

Figure 4:
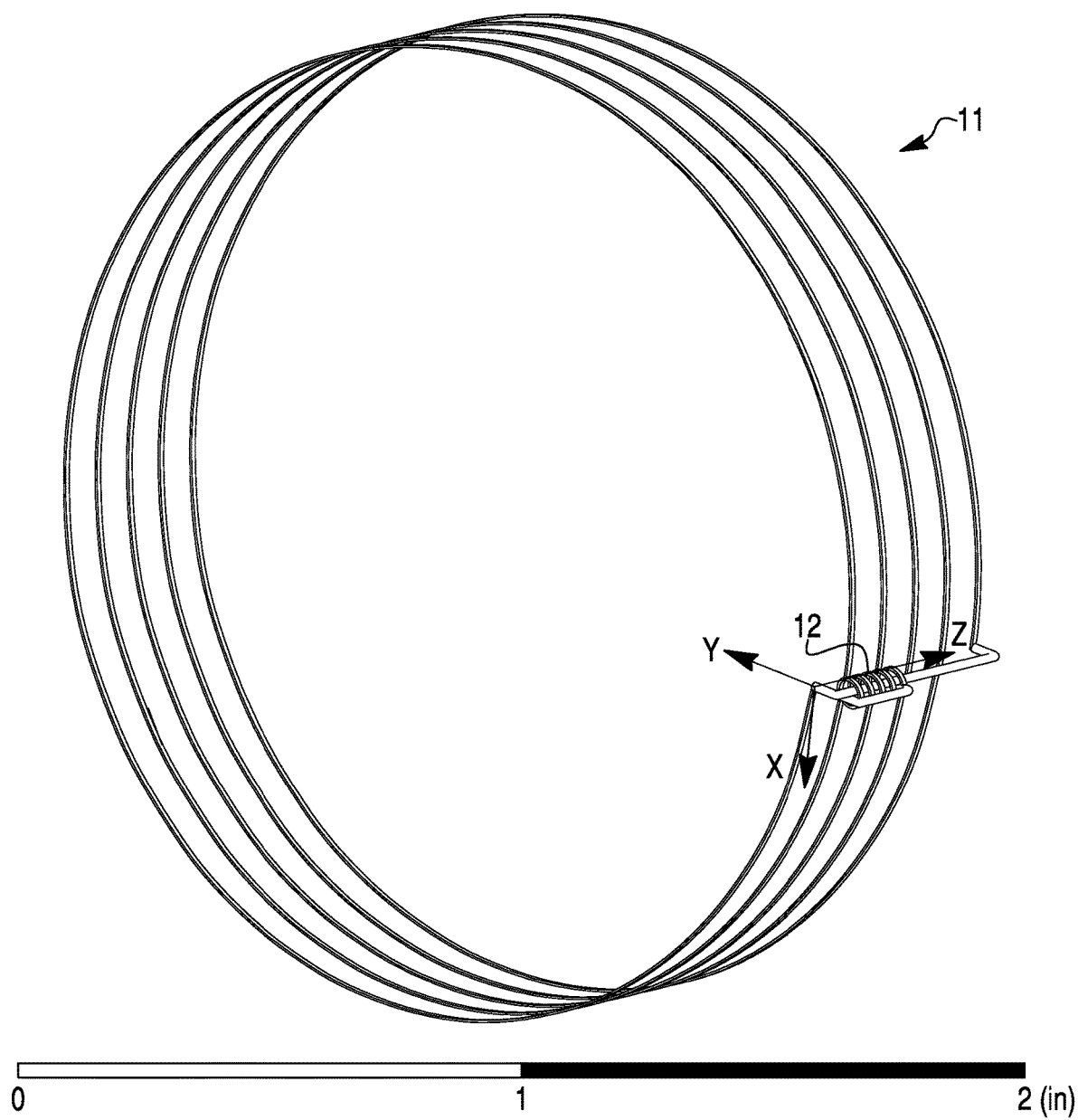
FIG. 4 is a diagram a resonant loop or antenna with a high index material substrate.

FIG. 4 is a diagram a high index resonant loop or antenna 11. With a resonant condition, more energy may be stored in the field with an increase of extent and intensity of the electromagnetic fields. The range and efficiency of the resonant coupling is proportional to a size of the loop or antenna. However, a physically small resonant loop or other antenna may be made effectively larger with a high index substrate. With a high index material in which permittivity matches permeability, there are almost no reflections at the surface of the substrate material. The increase of the loop or other antenna electrical size may increase a range for antenna configurations in which little of the near-field self-cancels.

Figure 5:
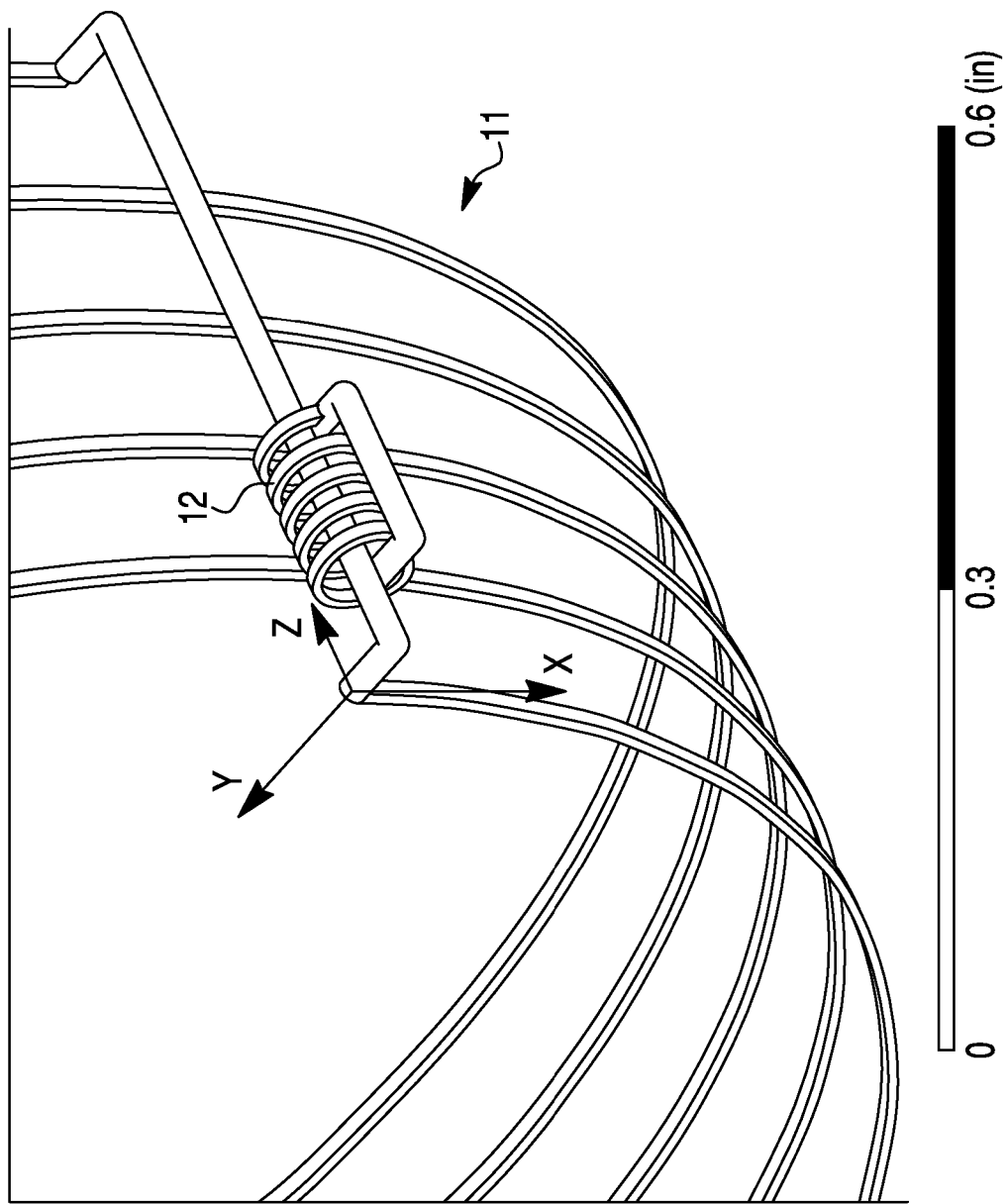
FIG. 5 is a diagram of the a loop or antenna along with a drive coil.

FIG. 5 is a diagram of an example resonant loop or antenna 11 along with an example drive coil 12.

Figure 6:
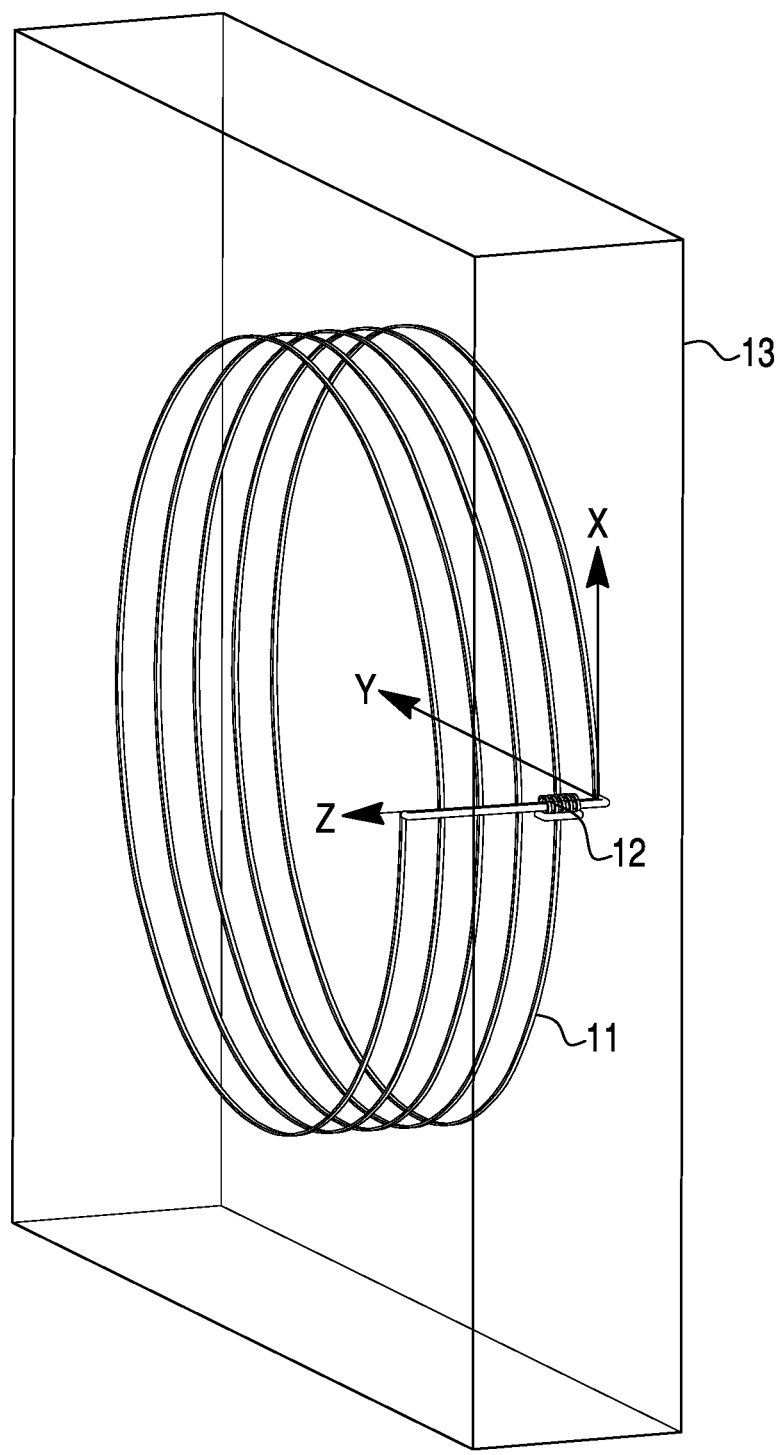
FIG. 6 is a diagram of the loop or antenna and drive coil situated in a high index material.

FIG. 6 is a diagram of loop or antenna 11 and coil 12 situated in a high index material 13.

Figure 7:
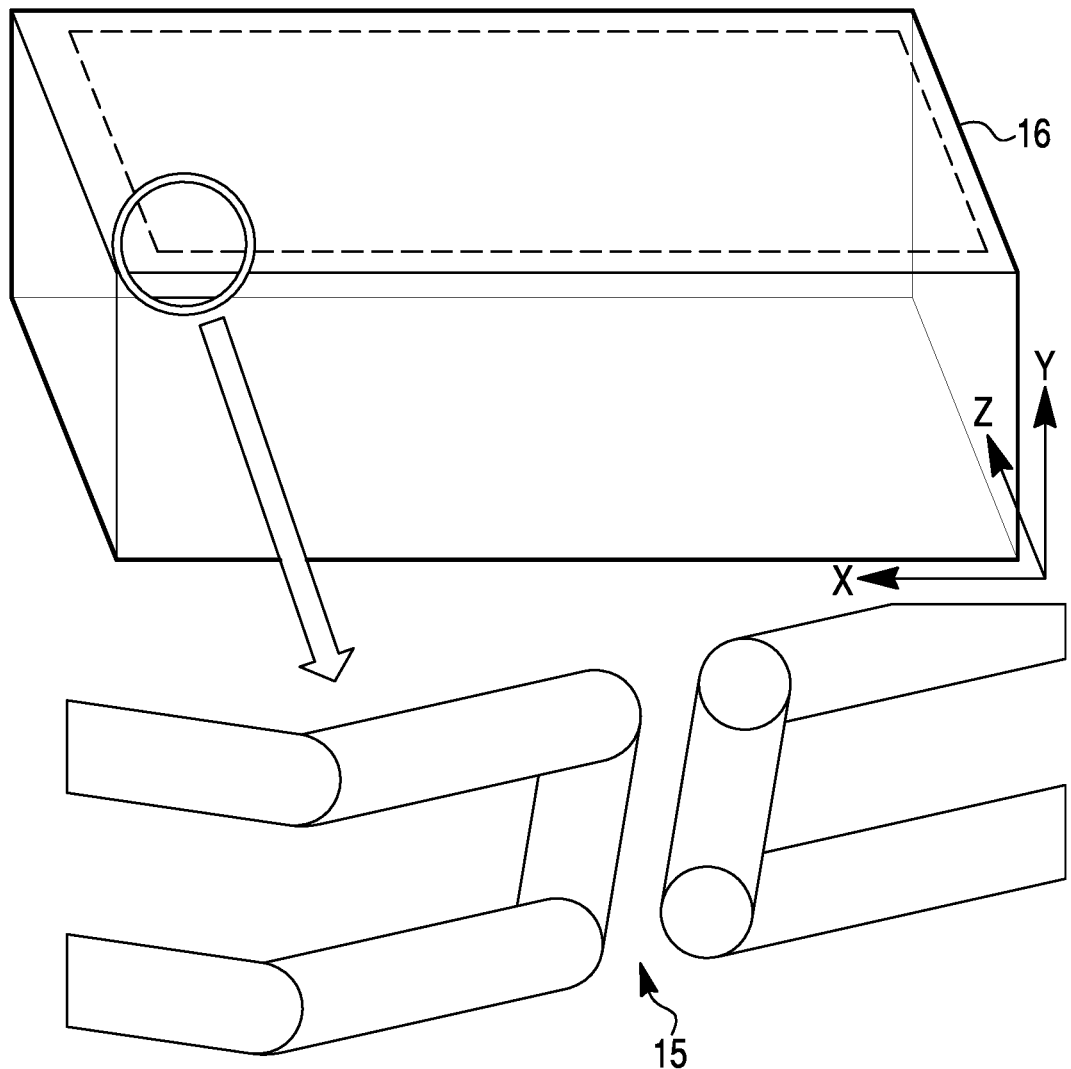
FIG. 7 is a diagram of a resonant attic or electrical yard loop or antenna.

FIG. 7 is a diagram of a "resonant attic" or "electrical yard" loop or antenna 15 situated in a yard or an attic 16. Resonant loop or antenna 15 may be installed in attic 16 by an installer of a security system. Wall power for controlling electronics may be attached to loop or antenna 15. Control electronics may automatically determine resonant and harmonic frequencies. Power and communication transfer may occur via the near-field at resonance and harmonics. Near-field Communication or traditional Far-Field Communication methods (e.g. Bluetooth Low Energy) with a device or devices receiving power may occur to optimize a coupling frequency or harmonic or mode. The loop or antenna may efficiently couple power throughout the home. Loop or antenna 15 may be buried in a yard for outdoor LED yard lighting and security sensors. Loop or antenna 15 in the yard may transfer power to sensors inside a home. Loop or antenna 15 may have a second purpose as an invisible dog fence. However, power transfer from loop or antenna 15 buried in the yard may be less efficient than power transfer from loop or antenna 15 in an attic due to the higher conductivity of materials exposed to electromagnetic energy communicated from the system.

Figure 8:
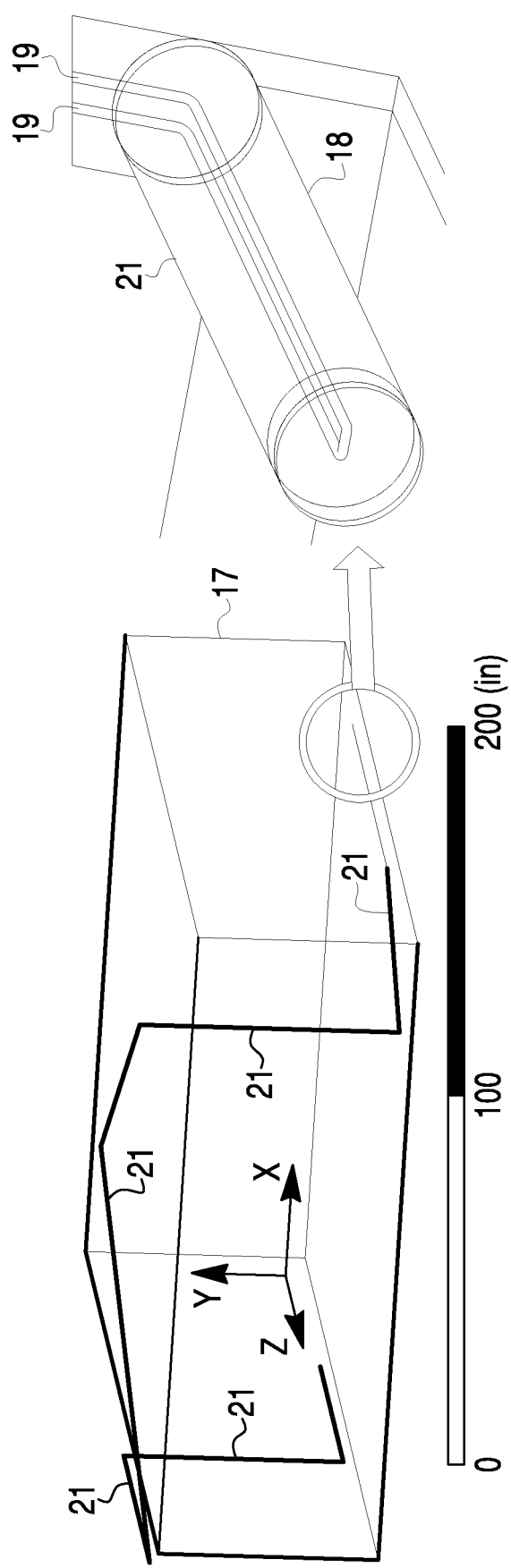
FIG. 8 is a diagram of a living room with an electrical conduit and wires that form a loop, antenna or electrical path.

FIG. 8 is a diagram of a living room 17 with electrically conductive conduit 18 and/or wires 19 that may form a Network or loop or antenna 21. Wires 19 may be electrical power wiring of room 17. Network or Loop or antenna 21 may be excited at resonance since at resonance and harmonics of the resonance, more energy is stored in the electromagnetic fields of loop or antenna 21 than when not operating at resonance or a harmonic. Low cost electronics may couple resonant or harmonic power and communication to the house or room 17 wiring 19 or conduit 18 for power coupling. The electronics may sense a resonant or harmonic frequency as loads change. The electronics may apply power to the house wiring (i.e., wires 19) at its resonant or harmonic frequency. There may be power coupling from loop or antenna 21 to electronic devices in room 17 via an evanescent tail coupling of a resonant field. Because the coupling is near-field, there are no intentional far-field radiated emissions which minimize FCC testing requirements.

There may be a communication link between the control electronics and a device or devices being powered provided by the near-field communications or other communication methods such as BLE. Resonant and harmonic Frequencies and communication modes may be coordinated for optimum coverage via such communications.

Figure 9:
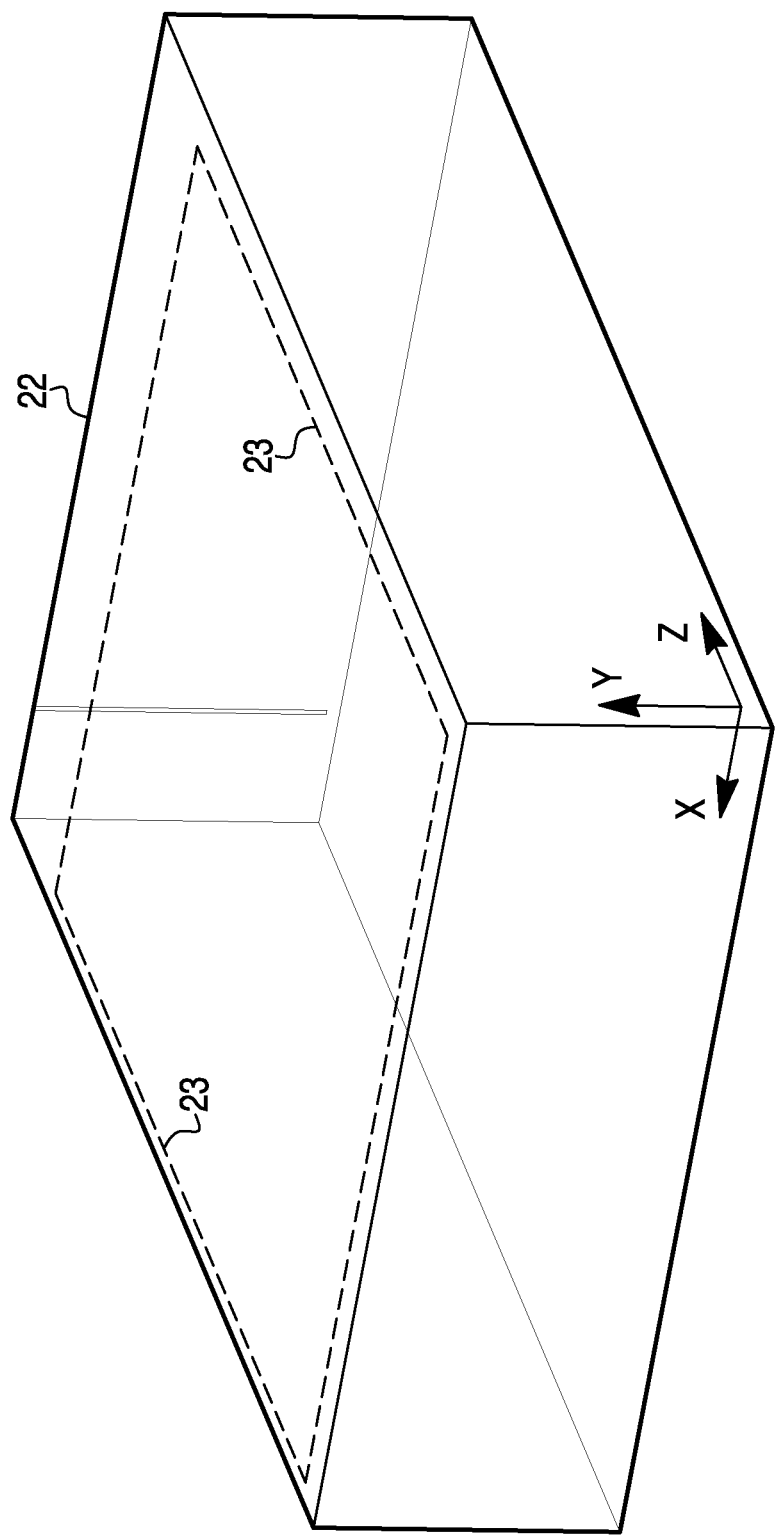
FIG. 9 is a diagram of an attic having a loop or antenna around it.

FIG. 9 is a diagram of an attic 22 having a loop or antenna 23 around it.

Figure 10:
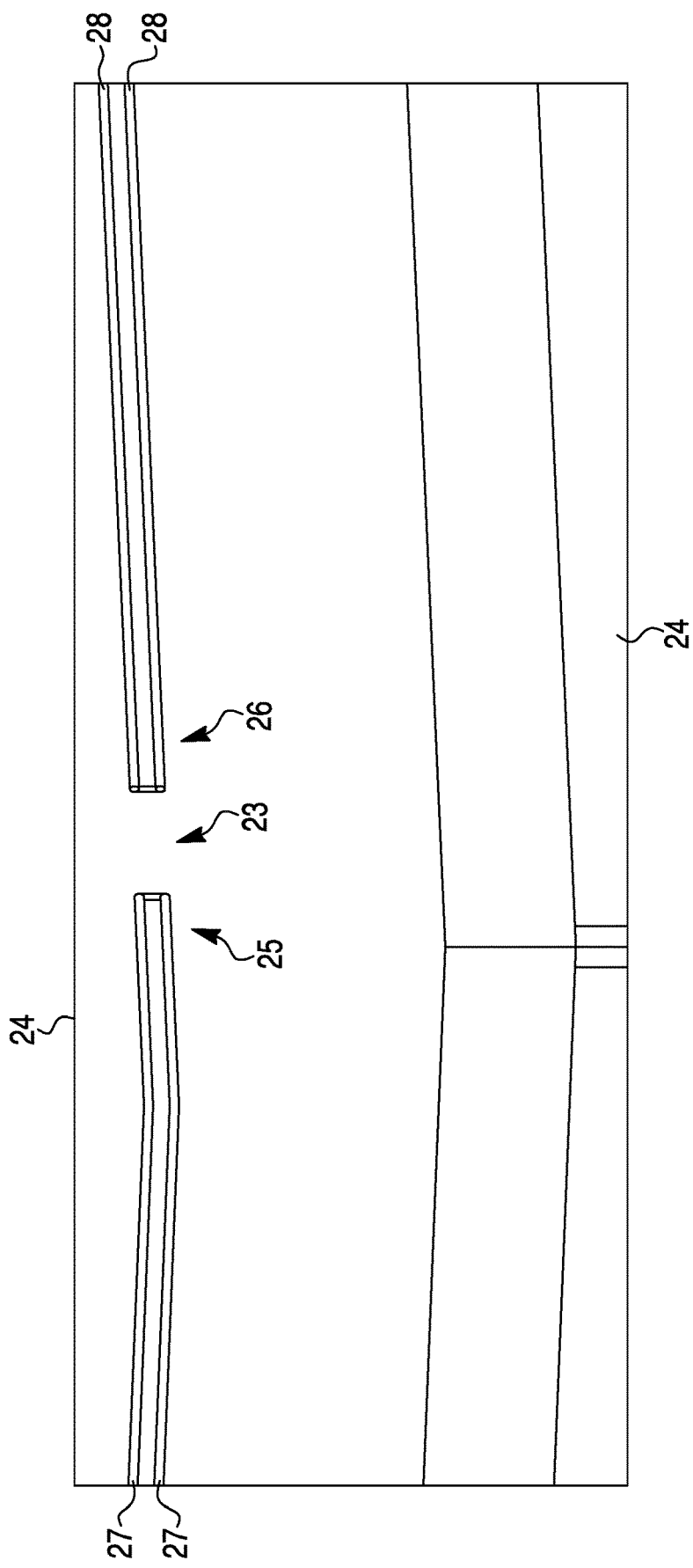
FIG. 10 is a diagram of a resonant loop or antenna and port in a volume such as a room or substrate.

FIG. 10 is a diagram of a resonant loop or antenna 23 port in a space or volume such as in room 17, attic 22 or substrate 24. The resonant loop or antenna port may incorporate loops or antennas 25 and 26 having wires 27 and 28, respectively, composing the loops or antennas.

A loop may be just one of many types of antennas. The word "loop", even though an antenna, may refer to an older, less efficient approach for of transferring power wirelessly than other antenna configurations. Configurations such as a monopole and dipoles may provide higher efficiency due to reduced self-cancellation effects.

One kind of an antenna may be a dipole with a thin high index coating. A dipole with a high-index coating which, for instance, is bent 90 or so degrees at a half-way point may reduce a use of space without experiencing self-cancellation.

Figure 11:
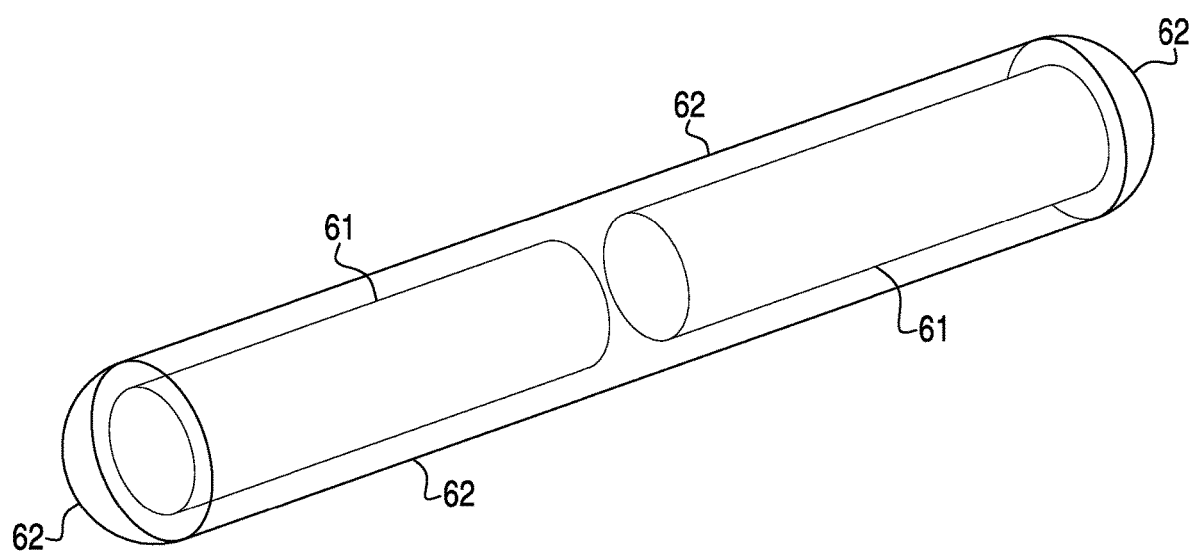
FIG. 11 is a diagram of a dipole antenna with a thin high index coating.

FIG. 11 is a diagram showing a perspective view of a dipole antenna 61 encapsulated in high index material 62 to enable a size reduction, but which does not necessarily suffer from current cancellation issues of a loop antenna.

Figure 12:
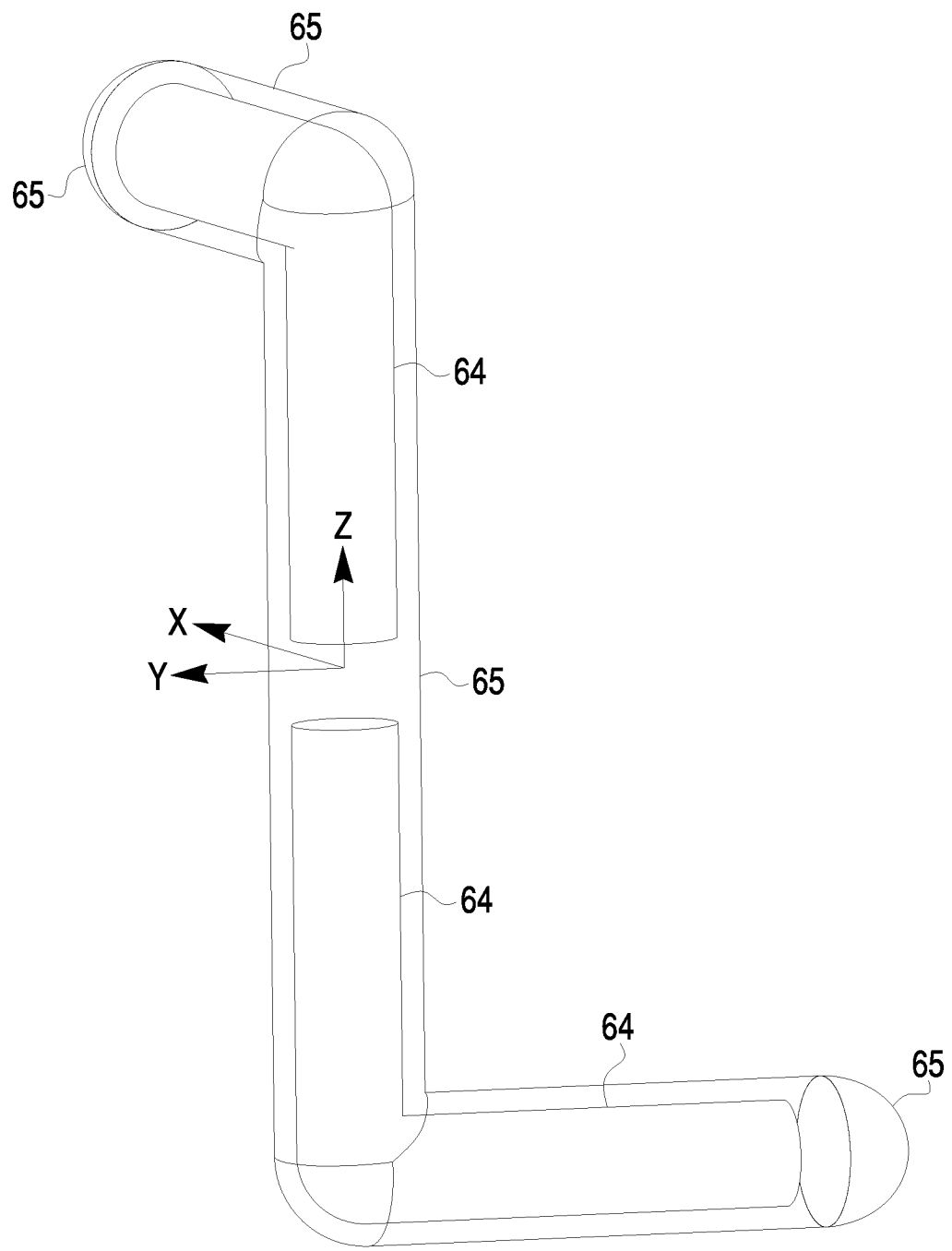
FIG. 12 is a diagram of a bent dipole antenna embedded in a high index material.

FIG. 12 is a diagram of a bent dipole antenna 64 which is embedded in a high index material 65. The dipole may be bent so that no current cancellation occurs. The near-field may be more complex for complex shapes like this configuration which can cause higher order terms in the near-field to somewhat reduce efficiency.

To recap, a wireless power conveyance system may incorporate a high index substrate, a first antenna which includes antenna parasitics situated in the high index substrate, and a second antenna which includes parasitics situated up to a largest pre-determined distance from the second antenna where first antenna power can be conveyed from the first antenna to the second antenna. The first antenna has a resonant frequency. Power may be taken from the first antenna by the second antenna at the resonant frequency. High index means that the substrate reduces a needed physical size of the first antenna by a factor greater than one compared to the electrical size of the first antenna in air.

The factor may be between 7 and 20,000. A range of efficient power transfer from the first antenna to the second loop or antenna may be 0.4 times of the first and second loops' or antenna's resonant wavelength or less.

The system may further incorporate an electronic module having an output having a frequency set at the resonant frequency of the first antenna and/or harmonic frequency and/or frequencies of the first antenna. The output may be coupled to the first antenna to drive the first antenna at the resonant frequency and/or harmonic frequency and/or harmonic frequencies of the first antenna.

The electronics module may incorporate a sensor that can detect an amplitude of a signal on the first antenna.

The electronics module may vary the frequency of the output that drives the first antenna until an amplitude appears to be at a maximum at a certain frequency which is regarded as the resonant frequency or harmonic frequency of the first antenna.

A range for efficient power transferred from the first antenna to the second antenna may extend to 0.4 times, a wavelength of the resonant frequency of the first antenna, at most.

The second antenna may be smaller than the first antenna but compensated to resonate at the resonant or harmonic frequencies of the first loop or antenna for a wireless power transfer.

The high index substrate may incorporate a first material having a permeability between approximately 7 and 20,000, and a second material with a similar permittivity between 7 and 20,000.

An amount of the first material in a mixture with the second material may be between 25 percent and 75 percent. Other materials may also be included in the mixture, for example ABS or polycarbonate plastic.

The first material may be a ceramic. The second material may be a ferrite.

A mechanism for wireless power transfer may incorporate a first conductive antenna having a physical length between 0.1 inch and 5000 feet and having a resonant frequency and/or harmonic frequencies, an interface electronics connected to the first conductive antenna to excite or operate the first conductive antenna with electricity from a power grid, and a second conductive antenna that has a physical length more or less than the physical length of the first conductive antenna and is tuned to the resonant and/or harmonic frequency of the first conductive antenna. The second conductive antenna may receive power wirelessly from the first conductive antenna.

The interface electronics may incorporate a sensor that detects an amplitude in the first conductive antenna. The interface electronics may excite or operate the first antenna at a frequency that is varied by the interface electronics to a frequency that results in a maximum amplitude of the signal in the first antenna and thus that frequency may be taken as the resonant or harmonic frequency or frequencies of the first antenna.

The first antenna may surround a building.

The first antenna may be embedded in ground.

The first antenna or network may incorporate wiring that is part of a building.

A distance of efficient power transfer from the first antenna to the second antenna may be up to 0.4 times a wavelength of the resonant frequency.

The interface electronics may operate or excite the first antenna at a first, second or third or fourth or fifth resonance or multiple resonances simultaneously.

The interface electronics can modulate an excitation or operation of the first antenna with data or communications to be received by the second antenna.

The interface electronics may encrypt the data or communications.

An approach for transferring power, may incorporate developing a first antenna from existing wiring in a building, operating the first antenna at a resonant frequency or harmonic frequency or combination of such frequencies via interface electronics connected to a power grid, receiving power with a second antenna at the resonant frequency or harmonic frequency or combination of such frequencies, and causing communication between the interface electronics and the second antenna to dynamically adjust the frequency at the first antenna to maximize delivered power or to switch from one resonant frequency to another resonant frequency or frequencies to ensure that another device can receive power.

The second antenna may be smaller than the first antenna but can be made to resonate like the first antenna, with inductors and capacitors, as needed, to achieve efficient wireless power transfer from the first antenna to the second antenna and communication between antennas.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A mechanism for wireless power transfer comprising:
   a first conductive antenna having a physical length between 0.1 inch and 5000 feet and having a resonant frequency or one or more harmonic frequencies;
   an interface electronics connected to the first conductive antenna to excite or operate the first conductive antenna with electricity from a power grid; and a second conductive antenna that has a physical length more or less than the physical length of the first conductive antenna and is tuned to the resonant or harmonic frequency of the first conductive antenna; and wherein the second conductive antenna receives power wirelessly from the first conductive antenna; and wherein the interface electronics are configured to dynamically adjust a resonant frequency of the first antenna at or between a first, second, third, fourth, or fifth resonance.

2. The mechanism of claim 1, wherein:

the interface electronics comprises a sensor that detects an amplitude in the first conductive antenna; and the interface electronics excites or operates the first antenna at a frequency that is varied by the interface electronics to a frequency that results in a maximum amplitude of the signal in the first antenna and thus that frequency is taken as the resonant or harmonic frequency or frequencies of the first antenna.

3. The mechanism of claim 1, wherein the first antenna surrounds a building.

4. The mechanism of claim 1, wherein the first antenna is embedded in ground.

5. The mechanism of claim 1, wherein the first antenna or network comprises wiring that is part of a building.

6. The mechanism of claim 1, wherein a distance of efficient power transfer from the first antenna to the second antenna is up to 0.4 times a wavelength of the resonant frequency.

7. The mechanism of claim 1, wherein the interface electronics can operate or excite the first antenna at multiple resonances simultaneously.

8. The mechanism of claim 1, wherein the interface electronics can modulate an excitation or operation of the first antenna with data or communications to be received by the second antenna.

9. The mechanism of claim 8, wherein the interface electronics encrypts the data or communications.

10. A mechanism for wireless power transfer comprising:

a first conductive antenna having a physical length between 0.1 inch and 5000 feet and having a resonant frequency or one or more harmonic frequencies, the first conductive antenna embedded in a high index material;

an interface electronics connected to the first conductive antenna to excite or operate the first conductive antenna with electricity from a power grid; and a second conductive antenna that has a physical length more or less than the physical length of the first conductive antenna and is tuned to the resonant or harmonic frequency of the first conductive antenna; and wherein the second conductive antenna receives power wirelessly from the first conductive antenna; and wherein the interface electronics can operate or excite the first antenna at multiple resonances simultaneously.

11. The mechanism of claim 10, wherein:

the interface electronics comprises a sensor that detects an amplitude in the first conductive antenna; and the interface electronics excites or operates the first antenna at a frequency that is varied by the interface electronics to a frequency that results in a maximum amplitude of the signal in the first antenna and thus that frequency is taken as the resonant or harmonic frequency or frequencies of the first antenna.

12. The mechanism of claim 10, wherein the first antenna surrounds a building.

13. The mechanism of claim 10, wherein the first antenna is embedded in ground.

14. The mechanism of claim 10, wherein the first antenna or network comprises wiring that is part of a building.

15. The mechanism of claim 10, wherein a distance of efficient power transfer from the first antenna to the second antenna is up to 0.4 times a wavelength of the resonant frequency.

16. The mechanism of claim 10, wherein the interface electronics are configured to dynamically adjust a resonant frequency of the first antenna at or between a first, second or third or fourth or fifth resonance.

17. The mechanism of claim 10, wherein the interface electronics can modulate an excitation or operation of the first antenna with data or communications to be received by the second antenna.

18. The mechanism of claim 17, wherein the interface electronics encrypts the data or communications.

* * * * *